(12) United States Patent
Padovani

(10) Patent No.: US 6,336,805 B1
(45) Date of Patent: *Jan. 8, 2002

(54) PLATE DEVICE FOR WITHDRAWING AND MOVING A MOLDING OF THERMOFORMED OBJECTS AWAY FROM A THERMOFORMING PRESS

(75) Inventor: Pietro Padovani, Verona (IT)

(73) Assignee: Isap Omv Group SpA, Parona (IT)

( * ) Notice: Subject to any disclaimer, the term of this patent is extended or adjusted under 35 U.S.C. 154(b) by 0 days.

This patent is subject to a terminal disclaimer.

(21) Appl. No.: 09/097,083

(22) Filed: Jun. 12, 1998

(30) Foreign Application Priority Data

Jun. 13, 1997 (IT) .......................................... VR97A0049

(51) Int. Cl.$^7$ ............................................... B29C 51/44
(52) U.S. Cl. .................................. 425/403.1; 425/436 R
(58) Field of Search .......................... 425/436 R, 403.1, 425/444, 351, 398

(56) References Cited

U.S. PATENT DOCUMENTS

| 3,345,684 | A | * | 10/1967 | Scherrer-Wirz | .......... 425/403.1 |
| 4,132,319 | A | * | 1/1979 | Padovani | .................. 425/403.1 |
| 4,464,329 | A | * | 8/1984 | Whiteside et al. | ........ 425/403.1 |
| 4,571,320 | A | * | 2/1986 | Walker | ..................... 425/403.1 |
| 4,872,826 | A | * | 10/1989 | Padovani | .................. 425/403.1 |
| 4,901,589 | A | * | 2/1990 | Gaigl | .......................... 425/444 |
| 5,304,050 | A | * | 4/1994 | Vismara | .................. 425/436 R |
| 5,354,194 | A | * | 10/1994 | Kresak | ......................... 425/444 |
| 5,591,463 | A | * | 1/1997 | Padovani | .................. 425/403.1 |
| 5,720,992 | A | * | 2/1998 | Brown | ......................... 425/388 |
| 5,850,107 | A | * | 12/1998 | Kindt-Larsen et al. | ....... 264/1.1 |
| 6,042,360 | A | * | 3/2000 | Padovani | .................. 425/403.1 |

FOREIGN PATENT DOCUMENTS

WO    WO 94/15863    7/1994

* cited by examiner

Primary Examiner—Nam Nguyen
Assistant Examiner—Thu Khanh T. Nguyen
(74) Attorney, Agent, or Firm—Ladas & Parry

(57) ABSTRACT

A device for withdrawing and carrying away thermoformed objects from a thermoforming single-station apparatus or press having a support frame, a feeder of sheet or tape material as well as a female die and a counterdie which are movably arranged one with respect to the other between a closed position in which the sheet or tape material fed by the feeder is thermoformed, and an opened position in which the female die and the counterdie are mutually spaced apart one with respect to the other. The plate device including a driving apparatus designed to move it along a straight path between a withdrawing position of the objects from the female die, while the latter is in its opened position, and an object releasing position away from the die. It includes a guide in the press arranged to engage and guide it at least along a length of the straight path thereof between the withdrawing and the releasing positions, thereby preventing vibrations from being imparted to the plate during or immediately after withdrawal of the objects.

13 Claims, 5 Drawing Sheets

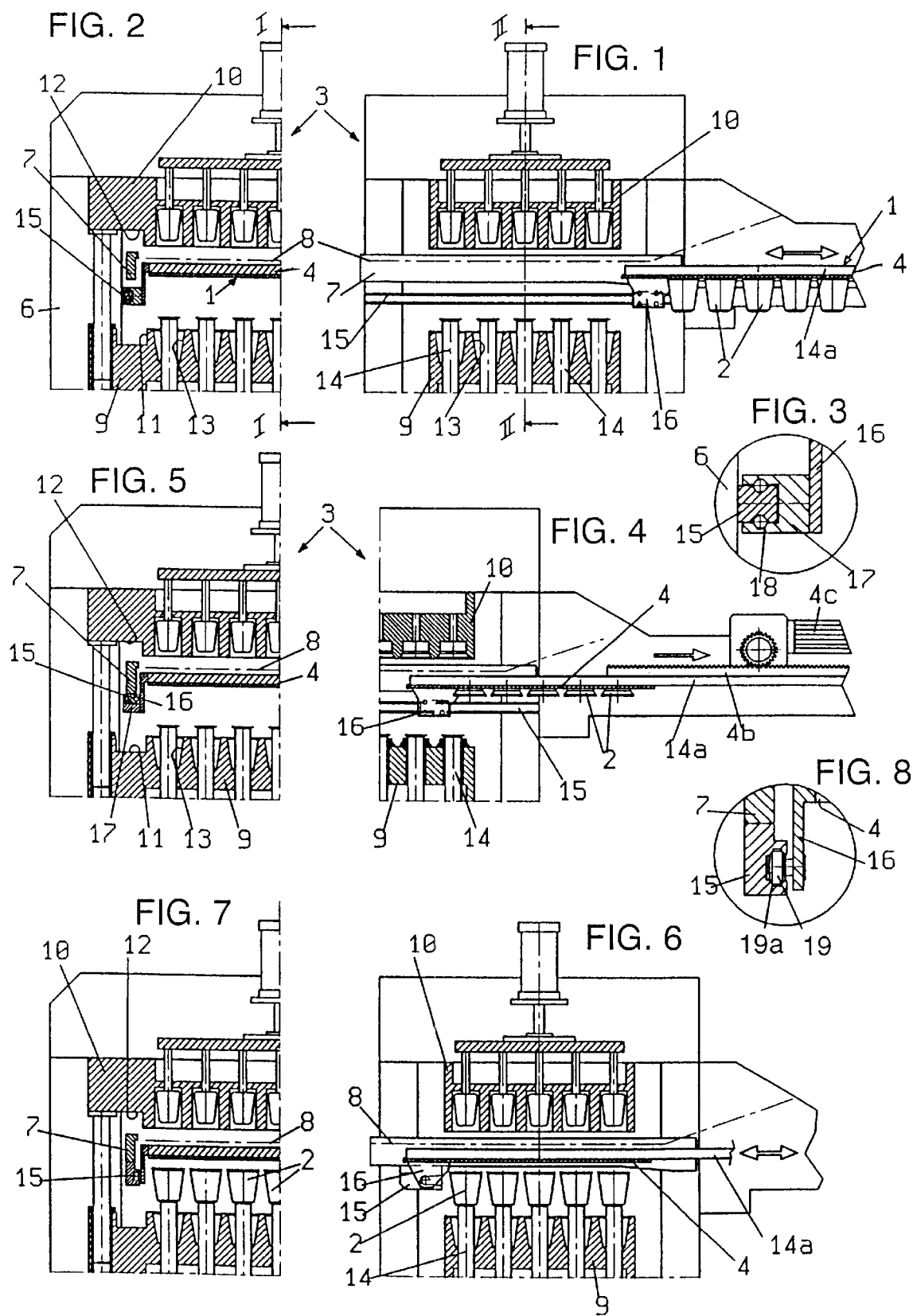

FIG. 10
FIG. 9
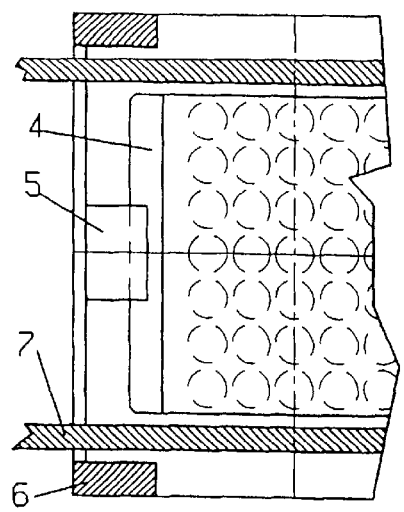
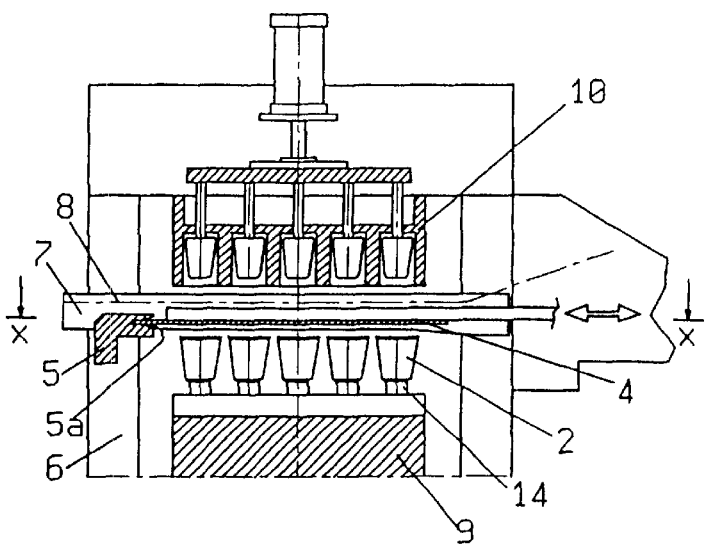
FIG. 12
FIG. 11
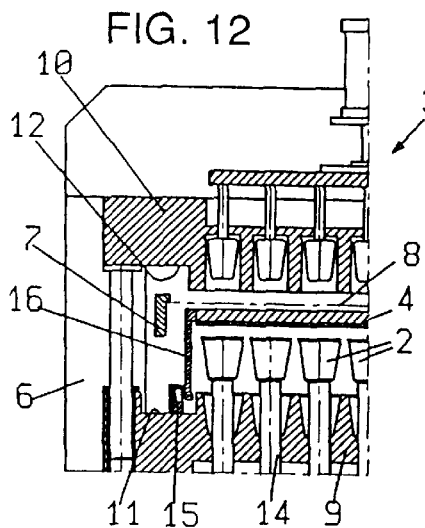
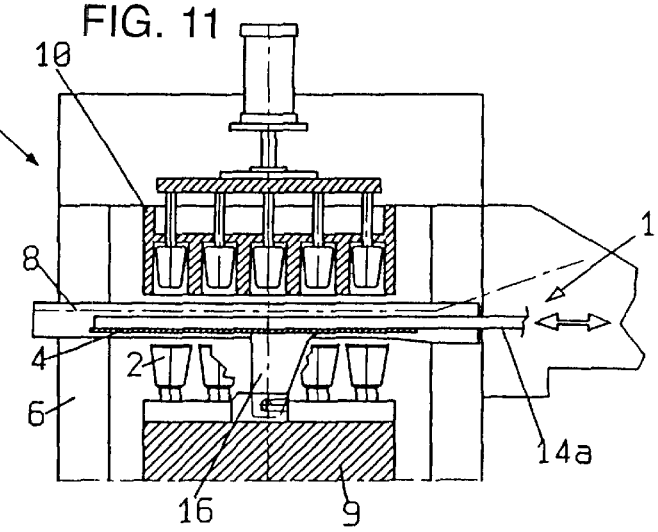
FIG. 14
FIG. 13
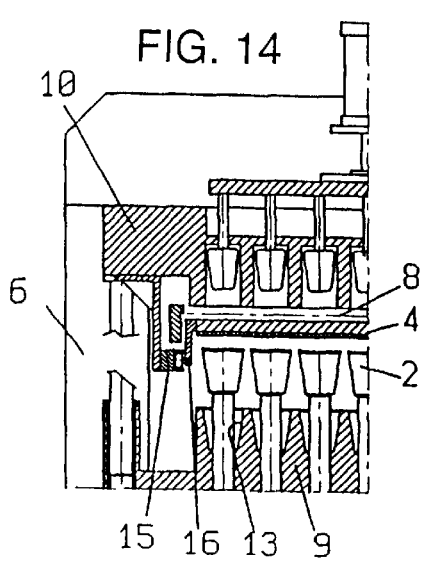
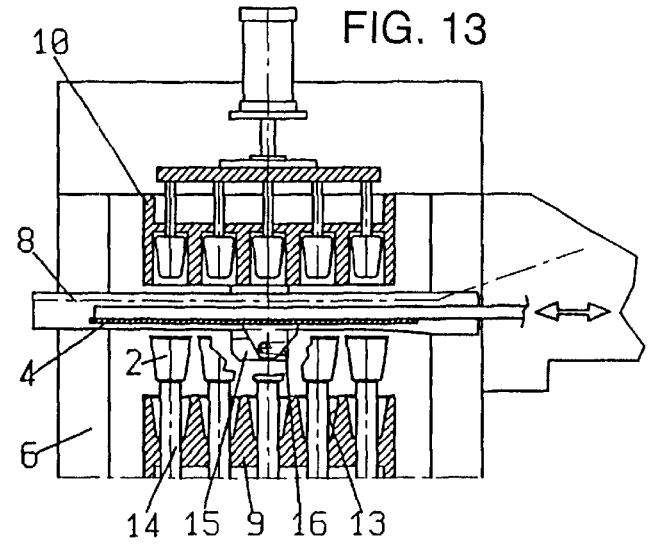

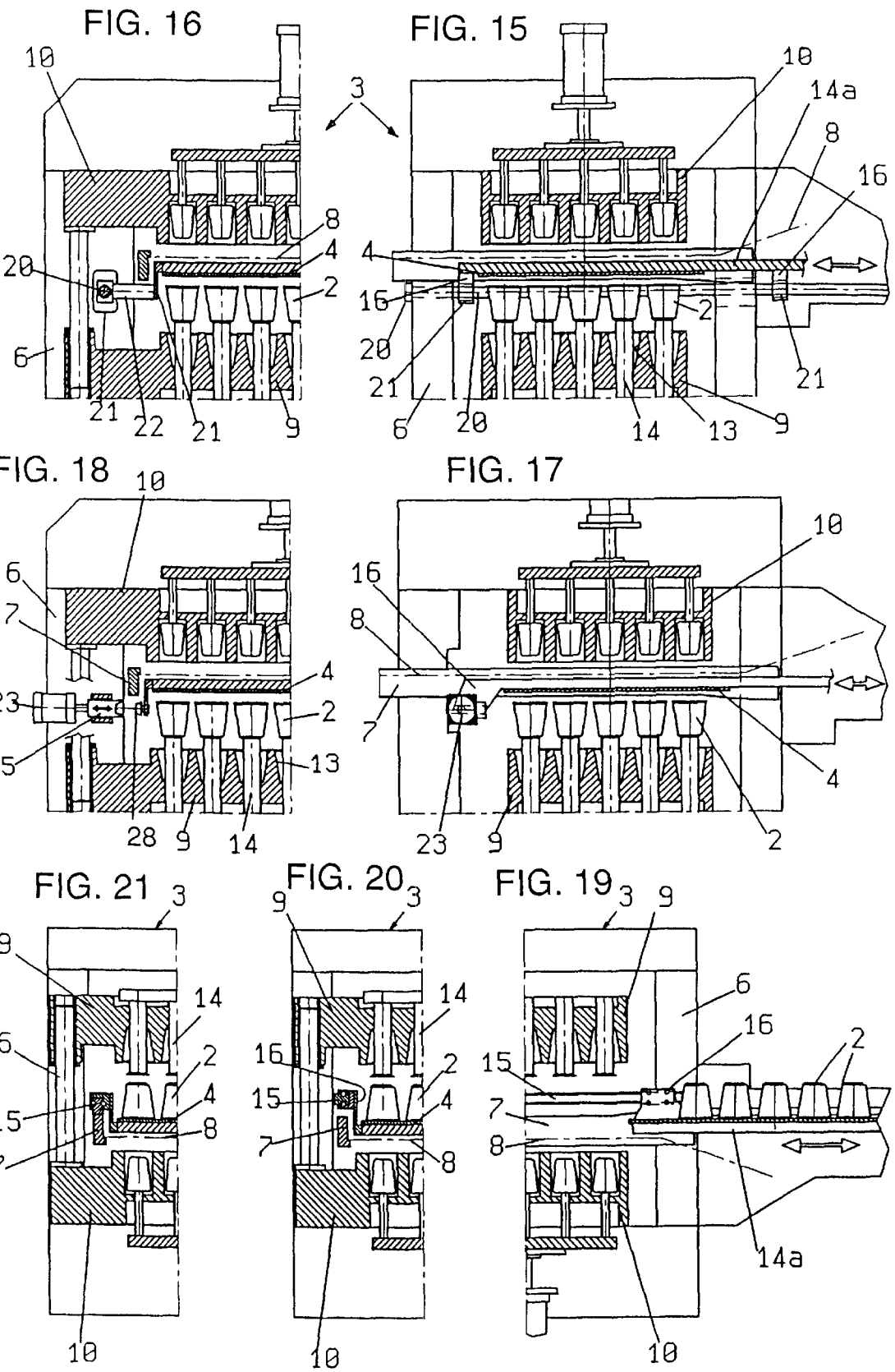

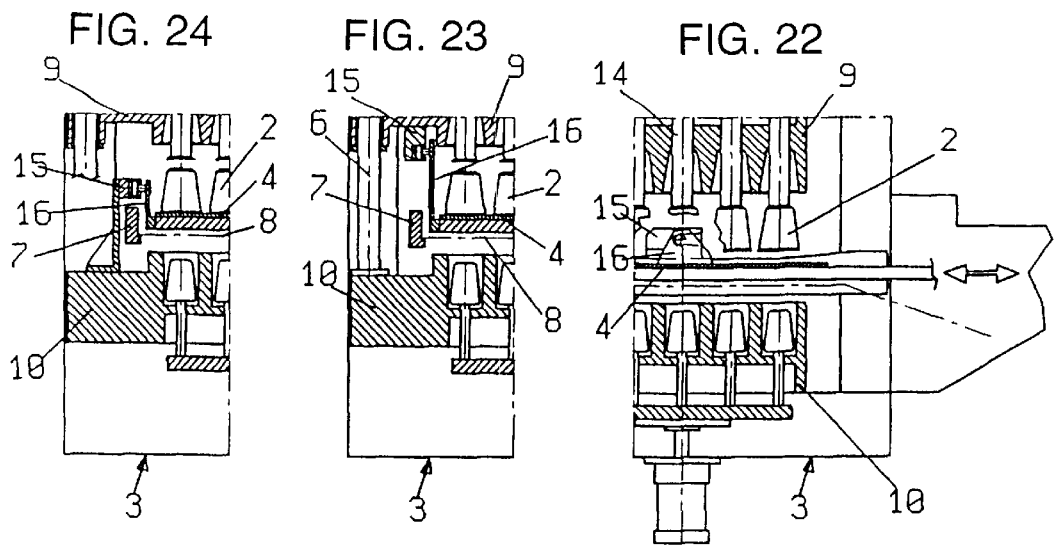
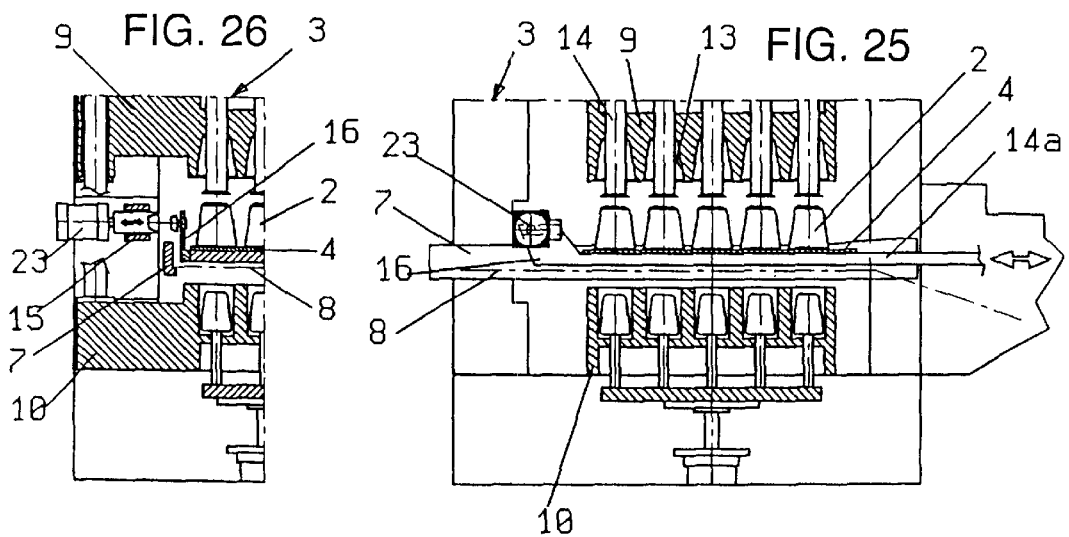
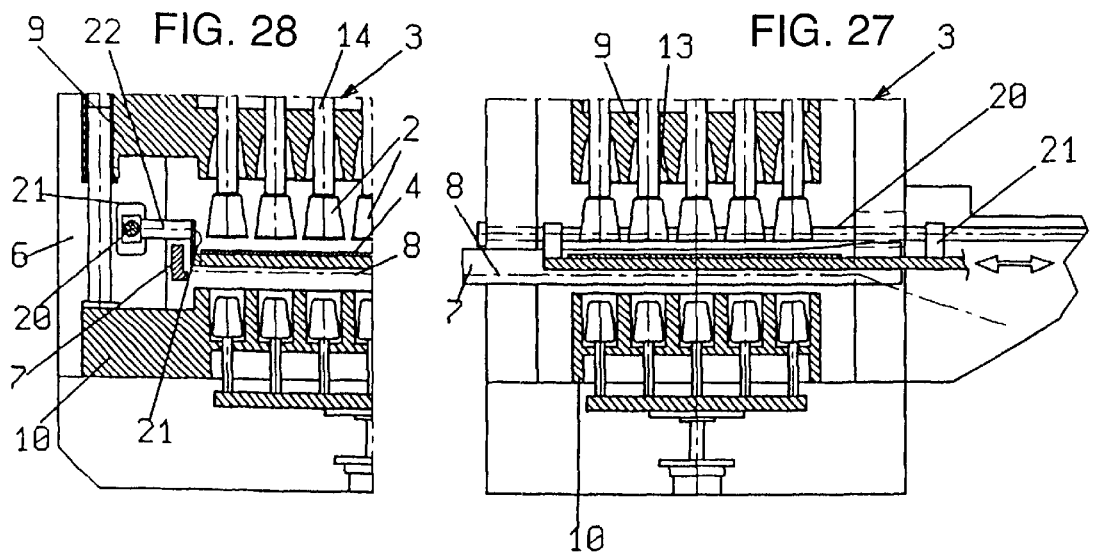

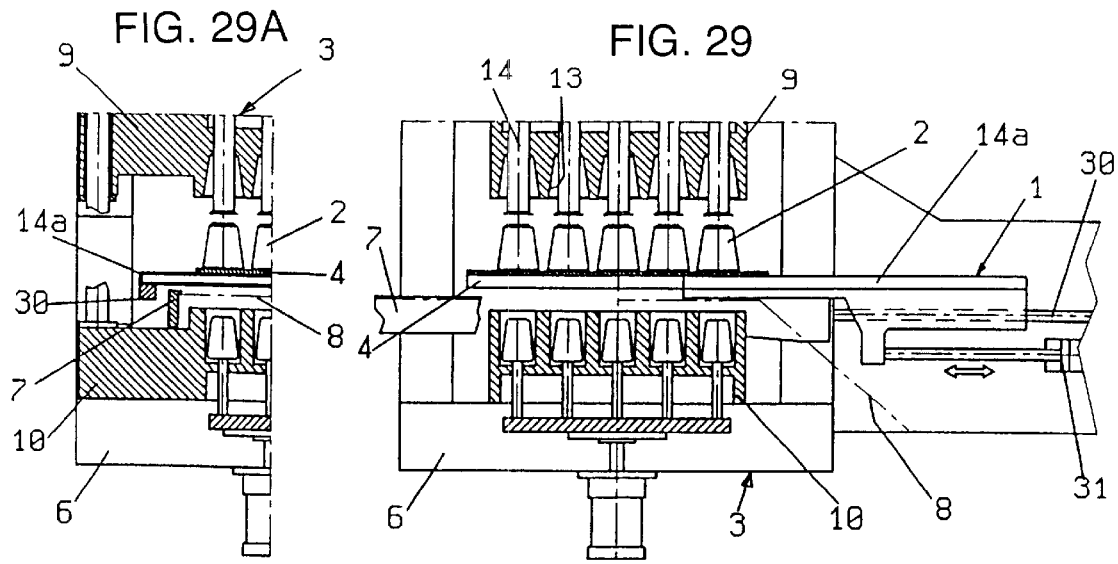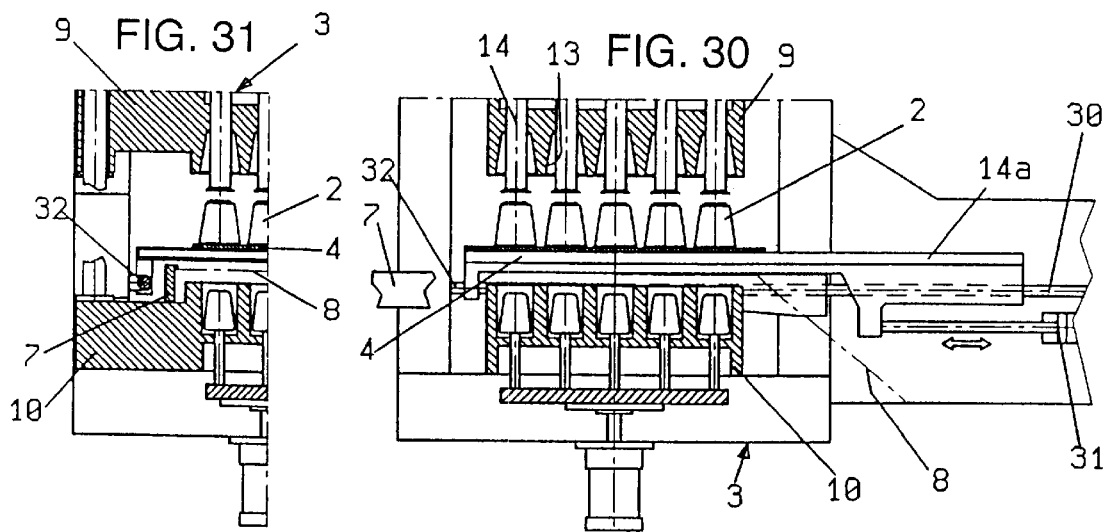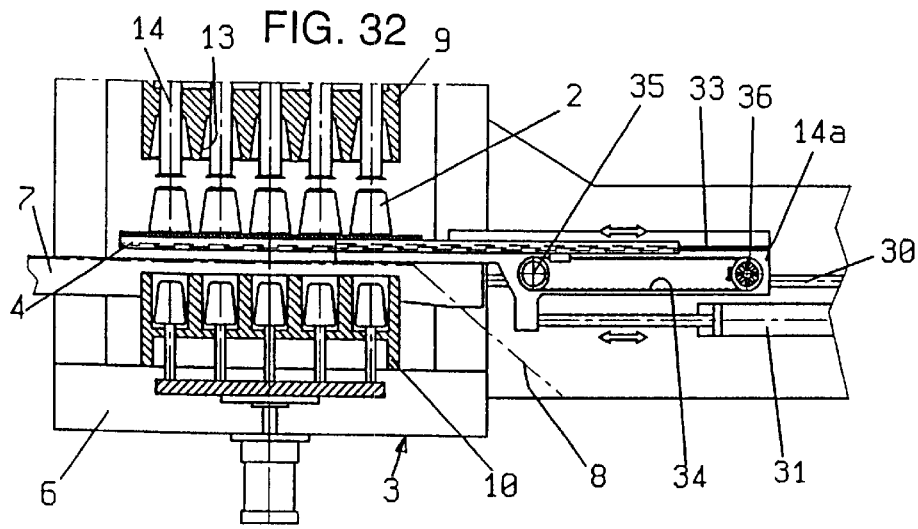

PLATE DEVICE FOR WITHDRAWING AND MOVING A MOLDING OF THERMOFORMED OBJECTS AWAY FROM A THERMOFORMING PRESS

TECHNICAL FIELD

The present invention relates to a plate device for withdrawing and moving a molding of thermoformed objects or articles away from a single station thermoforming apparatus or press acting on a sheet or tape of thermoplastic material.

BACKGROUND ART

Sucking and non-sucking plate devices provided with engaging means for the objects have already been proposed and widely used in the art. Such devices are prevailingly formed of a support arm which supports cantileverwise a withdrawing plate at one end thereof, and an actuation means arranged to move along a straight path the arm and thus the plate in a lateral direction with respect to the press between a withdrawing position in the press between a female mold or die and a counterdie in their open condition, i. e. spaced apart from one another, and a position away from the press.

However, first of all in consideration of the trend of increasing the number of thermoforming cycles in time unit in order to minimise the production costs, the risk exists of generating substantial inertia forces due to high accelerations and decelerations being produced in each working cycle.

Secondly, the withdrawing plates used up to now in the single-station thermoforming presses are all provided with a bracket with no guiding means along its sides or on its front opposite the front side of the plate at the mold or die zone.

A withdrawing plate of this type obviously has limitations in use owing to unavoidable vibrations given to the plate in relation to the production cycles and dimensions and weight of the same.

The important novelty of the present invention is that of having eliminated the difficulties preventing plate guide systems acting between the male and female dies mounted on the thermoforming press from being adopted.

Such obstacles were due to the structure of any thermoforming press, the presence of the sheet transport means inserted therein and possible guide means for the dies.

SUMMARY OF THE INVENTION

Accordingly, the main object of the present invention is to provide a plate device for withdrawing and carrying away a molding of thermoformed objects from a thermoforming single-station apparatus or press arranged to make it possible to carry out a safe and regular withdrawing of all the objects from a die with no variations in the configuration and geometry of mutual positioning of the objects.

Another object of the present invention is that such a plate device can be adapted to any types of thermoforming single-station press with female die arranged either below or above a counterdie or male die.

These and still other objects which will better appear below are attained by a plate device for withdrawing and carrying away a molding of thermoformed objects from a thermoforming single-station apparatus or press having a support frame, a feeder of sheet or tape material as well as a female die and a counterdie which are movably arranged one with respect to the other between a closed position in which the sheet or tape material fed by the feeder is thermoformed, and an opened position in which the female die and the counterdie are mutually spaced apart one with respect to the other, the said plate device comprising actuation means designed to move it along a straight path between a withdrawing position of the objects from the female die, while the latter is in its opened position, and an object releasing position away from the die, and being characterised in that it comprises guide means in the press arranged to engage and guide it at least along a length of the straight path thereof between the withdrawing and the releasing positions, thereby preventing vibrations from being imparted to the plate during or immediately after withdrawal of the objects.

Advantageously, the said guide means can be arranged on a component of the press or on the feeder of the sheet or tape material or on the die.

Brief Description of Drawings

Further advantages and features of the present invention will better appear from the following detailed description of a number of embodiments presently preferred thereof, which are given by way of indicative and non limiting examples, with reference to the accompanying drawings, in which:

FIG. 1 is a diagrammatic side elevation view in cross section taken along the line I—I of FIG. 2 of a thermoforming single-station apparatus or press having a plate device according to the present invention with guide means carried by the support frame of the press;

FIG. 2 is a half cross-section view taken along the line II—II of FIG. 1;

FIG. 3 shows a detail on an enlarged scale of FIG. 2;

FIG. 4 illustrates a half cross-section view similar to that of FIG. 1, but concerning a modification, in which the guide means are borne by the tape material feeder;

FIG. 5 is a cross-section view at 90° with respect to the view of FIG. 4;

FIGS. 6 and 7 are views similar to FIGS. 1 and 2 and illustrating a modification of FIGS. 4 and 5;

FIG. 8 shows a detail on an enlarged scale of FIG. 7;

FIG. 9 shows a view similar to that of FIG. 2, but concerning an embodiment comprising guide means arranged to engage the front of the withdrawing plate during its final length of inlet movement between die and counterdie and during its initial length of outlet movement therebetween;

FIG. 10 shows a diagrammatic partial cross-section view taken along the line X—X of FIG. 9;

FIGS. 11 and 12 are similar to FIGS. 1 and 2, but illustrating an embodiment with guide means carried by the female die of the press;

FIGS. 13 and 14 are similar to FIGS. 1 and 2 and illustrate an embodiment in which guide means are secured to the counterdie or male die of the press;

FIGS. 15 and 16 are similar to FIGS. 1 and 2 and show an embodiment having guide means comprising a pair of slide and support guides for the withdrawing plate;

FIGS. 17 and 18 show an embodiment of thermoforming press having movable guide means for the withdrawing plate;

FIGS. 19 to 28 illustrate presses having an upper female die and a lower male die and provided with guide means for the withdrawing plate;

FIGS. 29 and 29A are similar to FIGS. 1 and 2 and show telescopic support and guide means for the withdrawing plate which is guided only along a portion of its movement path between the thermoforming dies;

FIGS. 30 and 31 are similar to FIGS. 28 and 29 and illustrate a withdrawing plate guided along all its movement path between the thermoforming dies; and FIG. 32 is a cross-section view showing a guided support for the withdrawing plate having two driving units for its composite linear movement.

In the accompanying drawings equal or similar parts or components are indicated with the same reference numerals.

Best Modes for Carrying Out the Invention

With reference first to FIGS. 1 to 3, it will be noted that a plate device 1 according to the present invention for withdrawing and moving away a molding of thermoformed objects 2 from a thermoforming single-station press 3 comprises a withdrawing plate 4 which may be of any suitable type, e.g. of sucking type or provided with mechanical engaging and retaining means for the objects 2 as disclosed in the Italian patent application Ser. No. 1,262,775 filed on Jan. 12, 1993 and issued on Jul. 4, 1996 to the applicant of this application.

A thermoforming single-station press 3, as is known, is a press comprising a support frame, generally indicated at 6, a feeder 7 arranged to feed a sheet or tape material 8, as well as a female die 9—which in this embodiment is arranged below and an upper counterdie 10. The feeder 7 is usually of a chain type and is diagrammatically illustrated in the accompanying drawings as having two side members which extend to cross respective lateral recesses 11 and 12 formed in the female die 9 and the counterdie 10.

The female die and the counterdie are movably mounted one with respect to the other on the frame 6, thereby being movable between a closed position, in which the sheet or tape material 8 fed by the feeder 7 is thermoformed in order to obtain a thermoformed object 2 within each molding cavity 13 in the die and cut along the outer edge of each molding cavity, and an opened position, in which the female die and the counter die 10 are separated and moved away from each other.

While the female die 9 and the counterdie 10 are being moved apart from each other, the objects 2 are lifted from their respective molding cavities 13 by means of a respective extractor element 14, which is arranged to detach its respective just thermoformed object from its respective molding cavity and to move it to a fully or almost fully lifted or extracted position. Once such extracted position has been reached by the thermoformed objects 2, the operational sequence of the thermoforming press provides for the plate device 1 coming into action in order to withdraw the objects 2 from the area between the dies 9 and 10, while the same are in their opened position, and to transfer them elsewhere, e.g. to one or to a sequence of working or handling stations for the objects.

The withdrawing plate 4 of the plate device 1 is controlled by one or a pair of support arms 14a, which, on the one side, support cantileverwise the withdrawing plate 4 and, on the other, are supported by an actuation unit of any suitable type, such as of the type including a rack 4b operated by a reversible electric motor 4c as diagrammatically illustrated in FIG. 4 having the function of laterally moving the plate 4 with respect to the female die along a straight path between a withdrawing position in which a whole molding of objects 2 are removed from the female die, while the same is in its opened position, and a delivery position away from the die, in which the objects 2 are unloaded from the plate 4.

The plate device 1 is provided in the press 3 with suitable sliding guide means designed to engage the withdrawing plate 4 at least along its end portion or, in any case, along a portion of its movement path towards the withdrawing position and at least along its initial portion of its moving-away path therefrom, thereby making sure that the plate does not undergo vibratory or oscillation motions during or immediately after the thermoformed objects 2 have been withdrawn.

In FIGS. 1 to 3 the sliding guide means is of the rolling type and comprises a pair of ball bars 15 carried by the frame 6 of the press 3 and extending parallel to the inner opposite side walls of the female die 9 and the counter die 10, a pair of side brackets 16 secured at their front or distal part to the sides of the withdrawing plate 4, and a coulisse member 17 carried by each bracket 16 and having a longitudinal groove 18 so shaped as to slidably matching with a respective bar 15.

FIGS. 4 and 5 show an embodiment in which the bars 15 are carried below the side members of the feeder 7 for the tape or sheet material 8.

The embodiment shown in the FIGS. 6 to 8 is a modification of that shown in FIGS. 4 and 5, since the brackets 16 applied to the withdrawing plate 4 support an idle roller 18 designed to roll along a longitudinal groove 19a formed in a respective bar 15 carried by a side member of the feeder 7.

According to the embodiment shown in the FIGS. 9 and 10, the withdrawing plate 4 enters with its head a front guiding element 5, preferably provided with a flared inlet opening 5a, which is supported for example by the frame of the press and is arranged to hold slidingly engaged the front of the withdrawing plate 4 during its final section of its approaching or inlet movement path towards its withdrawing position and in the initial section of its outlet or moving-away path from the press.

Rolling sliding/guide means directly carried by the female die 9 entirely similar to that illustrated in FIGS. 6 to 8 is shown in FIGS. 11 and 12, whereas in FIGS. 13 and 14 the same guide means is supported by the counterdie 10.

FIGS. 15 and 16 show sliding guide means comprising a pair of polygonal cross-section bars 20, on which a pair of sleeves or rings 21 can slide which are carried by a respective arm 22 supported by a respective bracket 16 on two opposite sides of the withdrawing plate 4, which in this embodiment behaves like a slide that can be moved backwards and forwards along the guiding bars 20 carried by the frame 6 of the press 3.

FIGS. 17 and 18 show an embodiment of guide means having moving away guiding bars 15, i.e. movable guiding bars, e.g. owing to a fluid-operated unit 23, arranged to move towards and away from a working position, in which they engage for example with the roll 28 carried by a bracket 16 secured to the withdrawing plate 4, only during the end portion of the path thereof towards its withdrawing position and the initial portion of its moving-away path, the bars 15 being displaced towards their working position while the mold is being opened and away from it while the mold is being closed.

The embodiments shown in FIGS. 19 to 21, 22 to 24 and 25–26, and 27–28, respectively, relate to guide means entirely similar or equivalent to those already described above, but are provided on a thermoforming press 3 having its female die 9 arranged above and its counterdie 10 arranged below it, the objects 2 falling prevailingly by gravity onto the withdrawing plate 4.

The embodiment illustrated in FIGS. 29 and 29A comprises a support arm 14a which is guided along its path by straight sliding guides 30, e.g. carried by the support frame 6. The arm 14a partly extends cantileverwise and can partly enter between the female die 9 and the counterdie 10 together with the withdrawing plate 4 carried by it and is controlled by suitable driving means, e.g. a double-acting fluid-operated cylinder and piston unit 31.

FIGS. 30 and 31 show a modification of the embodiment of FIGS. 29 and 29A, in which the support arm 14a is guided both at the rear by straight sliding guides 30 and in front by guides 32 parallel to the guides 30.

In the modification shown in FIG. 32 the support 14a is guided, as in the embodiment illustrated in FIGS. 29 and 29A and the plate 4 is, in turn, slidably mounted on the support 14a along guides 33 parallel to the guides 30 and is provided with to and fro driving means, e.g. a chain or a belt 34 wound around two end pulleys 35 and 36, one of which is driven by a reversible motor. The withdrawing plate 4 thus effects a composite straight to and fro movement.

It will be easily understood that with a withdrawing plate device as that described above with reference to the accompanying drawings it is possible:

- to make sure that the withdrawing plate 4 is moved with no problem at maximum possible speed towards and away from the withdrawing position, thereby reducing to a minimum the dead translation time in favour of the active withdrawing time,
- to use a very thin withdrawing plate, so that the shortest possible opening movement of the dies is required for the benefit of the productive machine times,
- to use the lightest possible material for the withdrawing plate, thereby reducing to a minimum the inertia forces of the plate,
- to maintain the withdrawing plate in a perfectly plane and stable attitude in the withdrawing area, so that its facing position with respect to the thermoformed objects 2 is always right and constant in the time, thereby ensuring perfect interfacing between plate and objects, which results in accuracy and speed of execution of successive working and handling operations on the objects once the same have been moved away from the withdrawing zone.

All this is particularly important in consideration of the present tendencies of producing thermoforming presses operating with an increasingly higher number of cycles in the unit time and making use of dies having a larger number of molding cavities even with thermoformed objects of considerable high obviously in order to increase the productivity of the presses.

The technical solution of providing a withdrawing plate fully or partly guided along its movement path towards and away from a withdrawing position makes it possible to solve specific problems and the limits of a thermoforming system with withdrawing plate, i.e. preventing vibrations from being applied to the plate which has to effect quick movements first in one direction and then in the other, certainty of engaging and withdrawing the thermoformed objects in optimal conditions independently of their geometrical configuration, their height and weight, as well as of the number of cycles in the time unit of the thermoforming press.

Moreover, the fact that the withdrawing plate is forced by being guided to set in withdrawing position at a constant distance in height makes it possible to adjust the movements of the components arranged to perform the extraction from the die so that to maintain to a minimum throughout the surface of the plate the distance between the plate and the uppermost mouth or surface of the thermoformed objects, thereby keeping to a minimum the travel length of the withdrawing components.

The above described invention is susceptible to numerous modification and variations within the scope of the claims.

What is claimed is:

1. A device for withdrawing and carrying away a molding of thermoformed objects from a thermoforming single-station apparatus or press having a support frame, a feeder of sheet or tape material as well as a female die and a counterdie, the dies being supported by said support frame and being movably arranged one with respect to the other between a closed position in which the sheet or tape material fed by the feeder is thermoformed, and an opened position in which the female die and the counterdie are mutually spaced apart one with respect to the other, the feeder feeding the sheet or tape material between the female die and the counterdie said device comprising a horizontally disposed withdrawing plate having a plurality of openings therein for receiving said molding of thermoformed objects, said withdrawing plate being supported in a cantilevered manner from said support frame, driving means for moving the plate along a straight path between a withdrawing position of the objects from the female die, while the latter is in its opened position, and an object releasing position away from the die, while the latter is in its closed position, said device further including guide means in the press arranged to engage and guide said plate along opposite edges thereof at least along a length of the straight path thereof between the withdrawing and the releasing positions.

2. A device according to claim 1, wherein the guide means are arranged to engage at least aside or a front of the withdrawing plate.

3. A device according to claim 1, wherein the guide means comprises a pair of guides extending parallel to the female die and to the counterdie, at least a pair of side extensions at the front or a distal portion of the withdrawing plate, and a coulisse element for each bracket arranged to slidably engage with one said pair of guides.

4. A device according to claim 3, wherein between the said guides and each coulisse element rolling means are provided.

5. A device according to claim 3, wherein the pair of guides is supported by the frame of the thermoforming press.

6. A device according to claim 3, wherein the pair of guides is supported by one of the thermoforming dies.

7. A device according to claim 3, wherein the pair of guides is supported by the feeder of sheet or tape material.

8. A device according to claim 3, wherein the pair of guides are removable in that they are movable towards and away from a working position in which they slidably engage with the withdrawing plate while the female die and its counterdie are opened.

9. A device according to claim 8, comprising driving means for moving the said pair of guides to the working position and moving them away at each opening-closing cycle of the female die and the counterdie.

10. A device according to claim 1, wherein the guide means are to slidably engage at least one mobile support for the withdrawing plate.

11. A device for withdrawing and carrying away a molding of thermoformed objects from a thermoforming single-station apparatus or press having a support frame, a female die and a counterdie supported by said support frame, the dies being movably arranged with respect to each other between a closed position in which a sheet or tape material fed by a feeder is thermoformed, and an opened position in which the female die and the counterdie are mutually spaced apart one with respect to the other, the feeder of sheet or tape material having two side members extended across respective lateral seats formed in said female die and said counterdie, a plate device comprising driving means designed to move said plate device along a straight path between a withdrawing position of the objects from the female die, while the latter is in its opened position, and an object releasing position away from the die, wherein said plate device comprises guide means carried by said support frame to engage and guide said plate device at least along a portion of the straight part thereof between the withdrawing and the releasing position, thereby positively supported said plate device during or immediately after withdrawal of the objects.

12. A device according to claim 11, wherein said guide means are arranged to engage at least one side or one front of said plate device.

13. A device according to claim 11, wherein said guide means comprises a pair of guides extending parallel to said dies, at least one pair of extensions at a front or a distal portion of said plate device, a coulisse element for each bracket arranged to slidably engage with one of said pair of guides.

* * * * *